United States Patent [19]
Dean

[11] Patent Number: 5,487,361
[45] Date of Patent: Jan. 30, 1996

[54] SUPPLEMENTAL AUTOMOBILE SEAT FOR USE BY DOGS

[76] Inventor: Deanna Dean, 312 Woodward Rd., Media, Pa. 19065

[21] Appl. No.: 344,012

[22] Filed: Nov. 23, 1994

[51] Int. Cl.⁶ ..................................................... A01J 1/00
[52] U.S. Cl. .................................................... 119/28.5
[58] Field of Search .................................. 119/285, 769, 119/771, 784

[56] References Cited

U.S. PATENT DOCUMENTS

| | | | |
|---|---|---|---|
| 1,739,366 | 12/1929 | Lang. | |
| 2,499,103 | 2/1950 | Love | 119/28.5 X |
| 2,909,154 | 10/1959 | Thomas | 119/771 |
| 3,245,717 | 4/1966 | Levy. | |
| 4,860,689 | 8/1989 | Stewart | 119/28.5 |
| 4,943,105 | 7/1990 | Kacar et al. | 119/15 |
| 4,969,683 | 11/1990 | Wallace et al. | 297/250 |
| 5,123,377 | 6/1992 | Edwards | 119/28.5 |
| 5,133,294 | 7/1992 | Reid | 119/771 |
| 5,161,484 | 11/1992 | Duane | 119/28.5 |

Primary Examiner—Thomas Price

[57] ABSTRACT

A supplemental automobile seat for use by an animal comprising a horizontal seat component formed of a rigid material with parallel side edges, a rear edge positionable at the rear edge of a rear car seat and a parallel forward edge positionable forwardly of the forward edge of a rear car seat, the rigid component being covered on its upper surface with a cover over component, the width of the component being essentially the width of the rear car seat upon which it is positioned; a vertical seat component formed of a foam material with parallel side edges, an upper edge positionable at the upper edge of a rear car seat and a parallel lower edge positionable adjacent to the edge of the horizontal component, the vertical component being covered by a cover over the vertical component, the width of the component being essentially the width of the rear car seat upon which it is positioned; a hinge formed of the cover coupling the horizontal seat component and the vertical seat component for storage purposes; and a pair of vertical legs removably positioned with respect to the lower surface of the horizontal component adjacent to the forward end thereof, the legs having lower ends positionable on the floor of the car forwardly of the car seat.

1 Claim, 4 Drawing Sheets

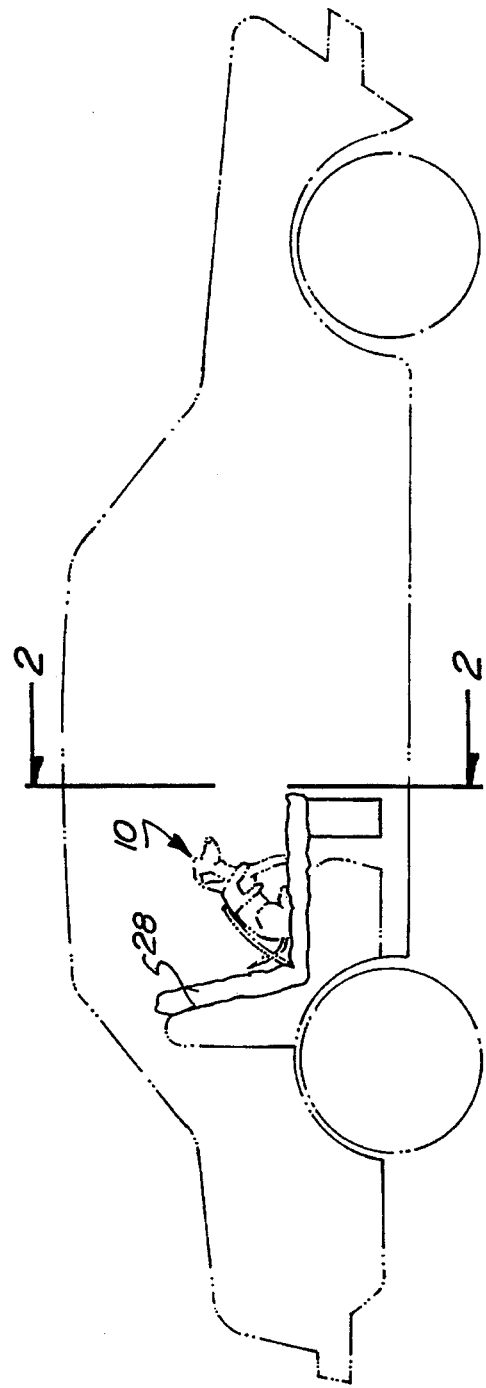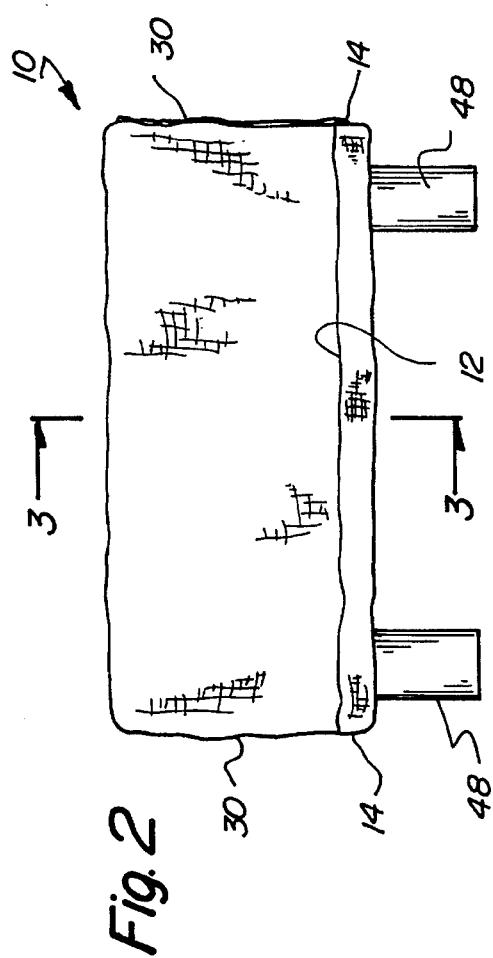

SUPPLEMENTAL AUTOMOBILE SEAT FOR USE BY DOGS

BACKGROUND OF THE INVENTION

1. Field of the Invention

The present invention relates to a supplemental automobile seat for use by dogs and more particularly pertains to providing comfort to pets in automobiles while abating the soiling of car seats.

2. Description of the Prior Art

The use of aids for pets to provide comfort and convenience to the pet as well as the owner of the pet is known in the prior art. More specifically, aids for pets to provide comfort and convenience to the pet as well as the owner of the pet heretofore devised and utilized for the purpose of assisting owners of pets in the care of such pets are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,007,676 quick detachable vehicle seat cover.

U.S. Pat. No. 5,044,321 discloses a pet carrier and restraint for vehicle use.

U.S. Pat. No. 5,123,377 discloses a collapsible vehicle safety restraint and seat for pets.

U.S. Pat. No. 5,133,294 discloses a pet carrier for vehicles.

U.S. Pat. No. 5,219,205 discloses an enveloping covering for a seat, and its application to vehicle seats.

In this respect, the supplemental automobile seat for use by dogs according to the present invention substantially departs from the conventional concepts and designs of the prior art, and in doing so provides an apparatus primarily developed for the purpose of providing comfort to pets in automobiles while abating the soiling of car seats.

Therefore, it can be appreciated that there exists a continuing need for a new and improved supplemental automobile seat for use by dogs which can be used for providing comfort to pets in automobiles while abating the soiling of car seats. In this regard, the present invention substantially fulfills this need.

SUMMARY OF THE INVENTION

In view of the foregoing disadvantages inherent in the known types of aids for pets to provide comfort and convenience to the pet as well as the owner of the pet now present in the prior art, the present invention provides an improved supplemental automobile seat for use by dogs. As such, the general purpose of the present invention, which will be described subsequently in greater detail, is to provide a new and improved supplemental automobile seat for use by dogs and method which has all the advantages of the prior art and none of the disadvantages.

To attain this, the present invention essentially comprises a new and improved supplemental automobile seat for use by dogs comprising, in combination a horizontal seat component formed of a rigid material with parallel side edges, a rear edge positionable at the rear edge of a rear car seat and a parallel forward edge positionable forwardly of the forward edge of a rear car seat, the rigid component being covered on its upper surface with foam and a cover over the foam and component, the width of the component being essentially the width of the rear car seat upon which it is positioned; a vertical seat component formed of a foam material with parallel side edges, an upper edge positionable at the upper edge of a rear car seat and a parallel lower edge positionable adjacent to the edge of the horizontal component, the vertical component being covered by a cover over the foam, the width of the component being essentially the width of the rear car seat upon which it is positioned; a hinge formed of the cover coupling the horizontal seat component and the vertical seat component for storage purposes; and a pair of vertical legs removably positioned with respect to the lower surface of the horizontal component adjacent to the forward end thereof, the legs having lower ends positionable on the floor of the car forwardly of the car seat.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved supplemental automobile seat for use by dogs which have all the advantages of the prior art aids for pets to provide comfort and convenience to the pet as well as the owner of the pet and none of the disadvantages.

It is another object of the present invention to provide a new and improved supplemental automobile seat for use by dogs which may be easily and efficiently manufactured and marketed.

It is further object of the present invention to provide a new and improved supplemental automobile seat for use by dogs which are of durable and reliable constructions.

An even further object of the present invention is to provide a new and improved supplemental automobile seat for use by dogs which are susceptible of a low cost of manufacture with regard to both materials and labor, and which accordingly are then susceptible of low prices of sale to the consuming public, thereby making such supplemental automobile seat for use by dogs economically available to the buying public.

Still yet another object of the present invention is to provide a new and improved supplemental automobile seat for use by dogs which provide in the apparatuses and methods of the prior art some of the advantages thereof, while simultaneously overcoming some of the disadvantages normally associated therewith.

Still another object of the present invention is to provide comfort to pets in automobiles while abating the soiling of car seats.

Lastly, it is an object of the present invention to provide new and improved supplemental automobile seat for use by an animal comprising a horizontal seat component formed of a rigid material with parallel side edges, a rear edge positionable at the rear edge of a rear car seat and a parallel forward edge positionable forwardly of the forward edge of a rear car seat, the rigid component being covered on its upper surface with a cover over component, the width of the component being essentially the width of the rear car seat upon which it is positioned; a vertical seat component formed of a foam material with parallel side edges, an upper edge positionable at the upper edge of a rear car seat and a parallel lower edge positionable adjacent to the edge of the horizontal component, the foam component being covered on its forward surface with a cover over the foam component, the width of the component being essentially the width of the rear car seat upon which it is positioned; a hinge formed of the cover coupling the horizontal seat component and the vertical seat component for storage purposes; and a pair of vertical legs removably positioned with respect to the lower surface of the horizontal component adjacent to the forward end thereof, the legs having lower ends positionable on the floor of the car forwardly of the car seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the preferred embodiment of the new and improved supplemental automobile seat for use by dogs constructed in accordance with the principles of the present invention.

FIG. 2 is a front elevational view of the device shown in FIG. 1 taken along line 2—2 of FIG. 1.

The same reference numerals refer to the same parts through the various Figures.

DESCRIPTION OF THE PREFERRED EMBODIMENT

Figure 3:
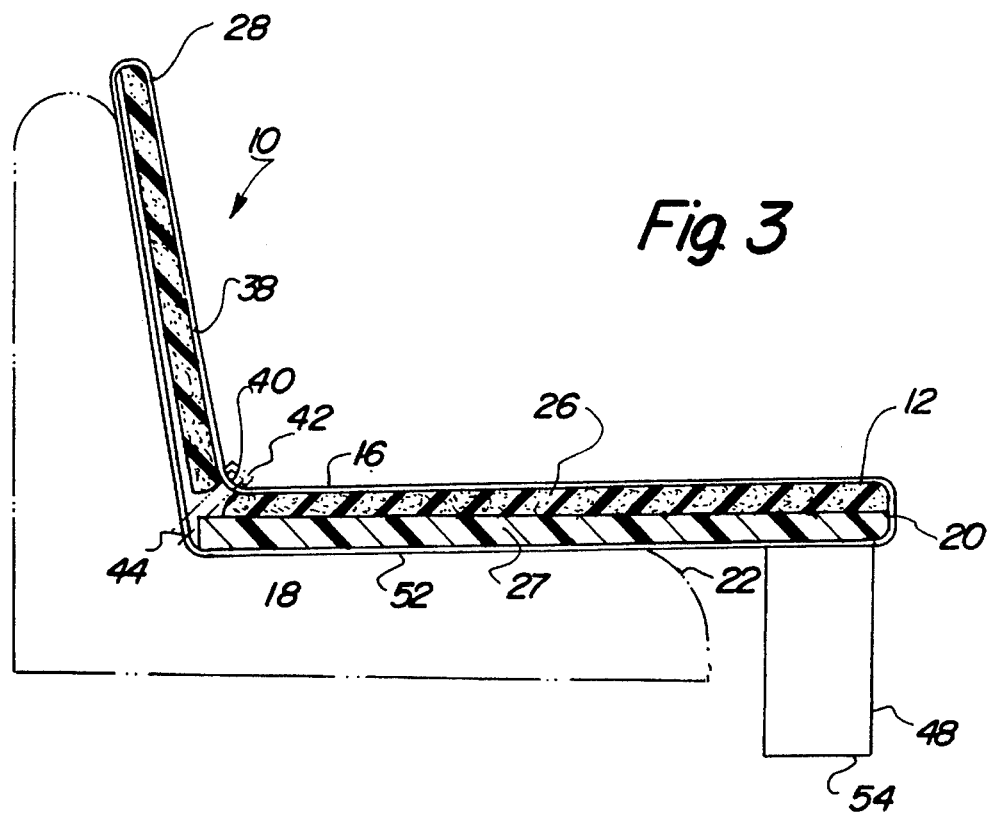
FIG. 3 is a cross-sectional view of the device taken along line 3—3 of FIG. 2.
Figure 4:
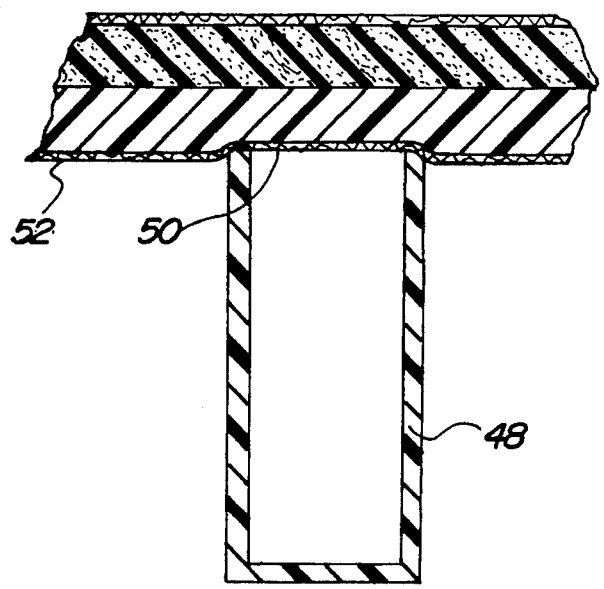
FIG. 4 is a cross-sectional view taken along line 4—4 of FIG. 3.
Figure 5:
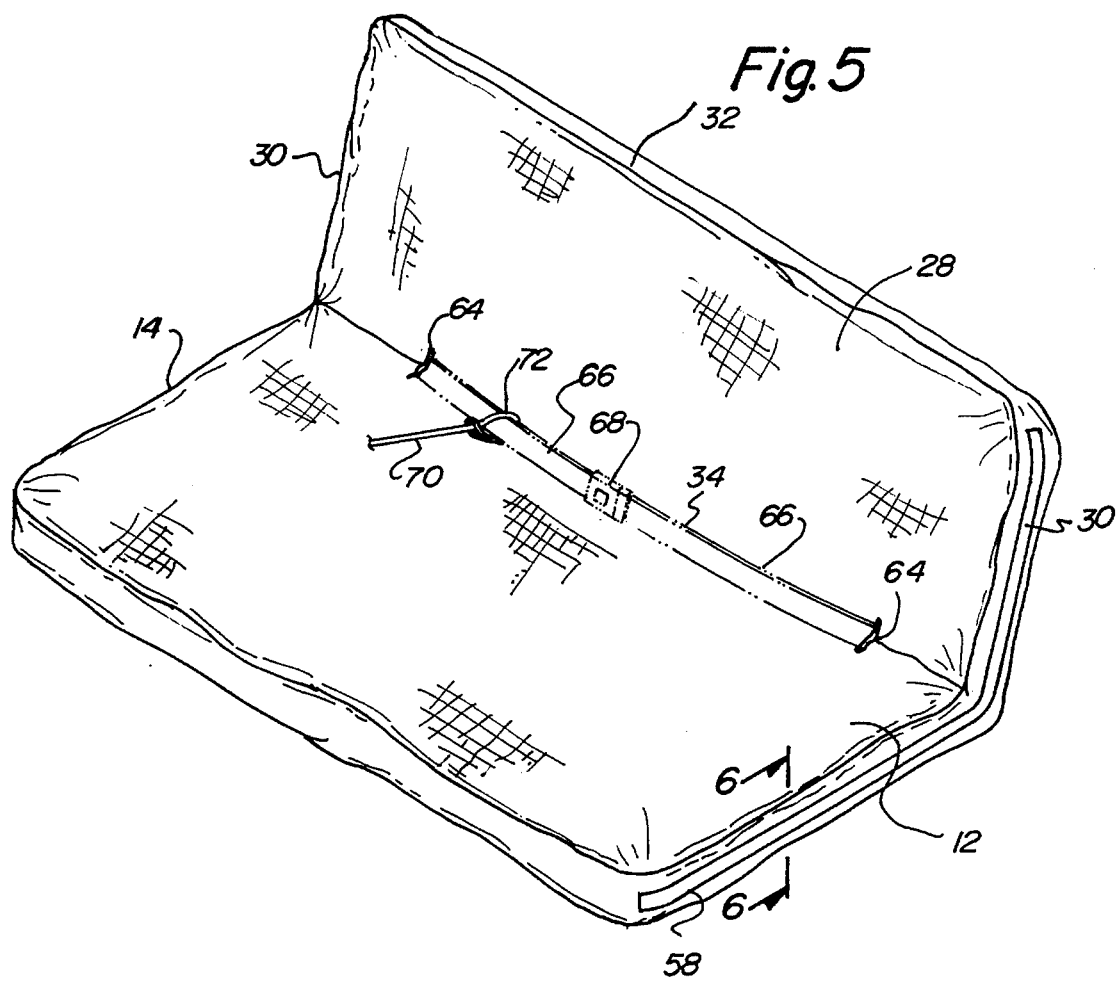
FIG. 5 is a perspective illustration of the device of the prior Figures.

With reference now to the drawings, and in particular to FIG. 1 thereof, the preferred embodiment of the new and improved supplemental automobile seat for use by dogs embodying the principles and concepts of the present invention and generally designated by the reference numeral 10 will be described.

The present invention, the new and improved supplemental automobile seat for use by dogs is comprised of a plurality of components. Such components include a horizontal seat component, a vertical seat component, a hinge and a pair of vertical legs. Such components are individually configured and correlated with respect to each other so as to attain the desired objective.

The central component of the system 10 of the present invention is a horizontal seat component 12. It is formed with parallel side edges 14. It also includes a rear edge 16 positionable at the rear edge of a car seat 18. It also has a forward edge 20 parallel with the rear edge. The forward edge is positionable forwardly of the forward edge 22 of the rear car seat.

The horizontal seat component 27 component is preferably fabricated of a rigid plastic or plywood and is covered on its upper surface with foam 26. The width of the horizontal seat component is essentially the width of the rear cover seat upon which it is positioned.

The next major component of the system 10 is a vertical seat component 28. The vertical seat component is formed of a foam material. It has parallel side edges 30. It also has an upper edge 32 positionable adjacent to the upper edge of the rear car seat upon which it is positioned. It also has a parallel lower edge 34. Such lower edge is positionable adjacent to the rearward edge of the horizontal component. The foam material has sufficient rigidity and structural integrity to maintain its shape as shown in FIG. 3 during normal operation and usage.

Figure 7:
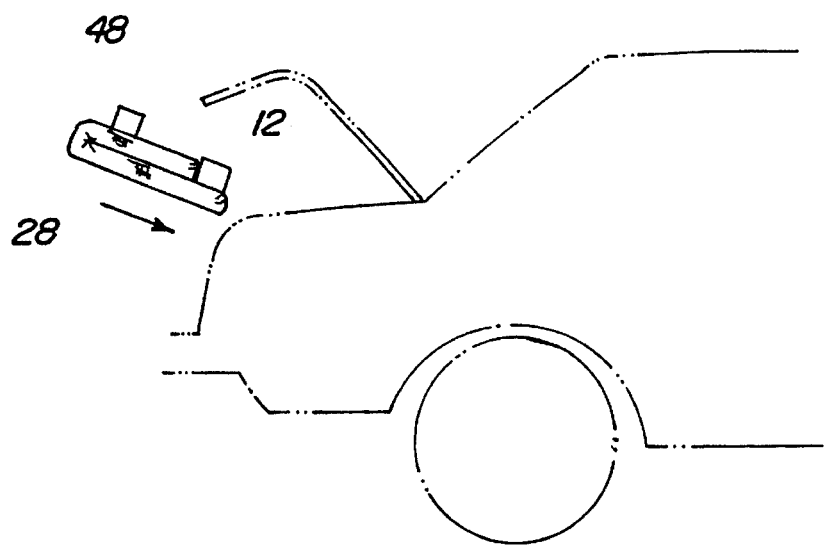
FIG. 7 is an end elevational view of the device in a folded condition in anticipation of storage.

The width of the vertical seat component is essentially equal to the width of the rear car seat upon which it is positioned. A removable cover is secured over the horizontal seat component 12 and the vertical seat component 28. In order to facilitate the storage of the apparatus, a living hinge 42 is provided. The living hinge is integral with and formed from the cover material at the region 44 between the horizontal seat component and the vertical seat component. The living hinge allows the horizontal seat component and the vertical seat component to be folded in facing contact with each other. Note this folded-up orientation of FIG. 7.

The last component of the system 10 according to the primary embodiment is a pair of vertical legs 48. Such legs are removably positioned within recesses 50 formed in the lower surface 52 of the horizontal component. Such recesses and legs are positioned adjacent to the forward end of the horizontal component. The legs have lower ends 54 positionable upon the floor of the car at a location forwardly of the rear car seat.

Figure 6:
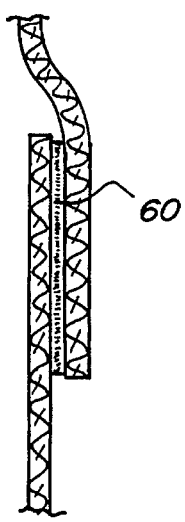
FIG. 6 is a cross-sectional view taken along line 6—6 of FIG. 5.

Inasmuch as the cover of the apparatus will become soiled through time and usage, a slot 58 is formed along one side edge of the device in the cover. The slot is formed in an overlapped relationship. Note FIG. 6. In association therewith, pile-type fasteners 60 are attached to the areas of overlap adjacent to the slot. In this manner, the slot may be opened and closed to allow removal of the cover from the remainder of the device for being cleaned.

In association with the apparatus as described above, slots 64 are formed adjacent to the side edges of the apparatus in the area of the hinge where the horizontal and vertical seat components are joined. This allows for the two halves of the seat belt 66 to pass therethrough. The buckle 68 of the seat belt is located above the upper surface of the apparatus adjacent to the lateral midpoint thereof. In this manner, a dog leash 70 with a loop 72 at the handle end may be positioned and secured in location with respect to the seat belt to ensure that the animal, preferably a dog held thereby will be restrained from movement only upon the horizontal seat component of the apparatus.

Figure 8:
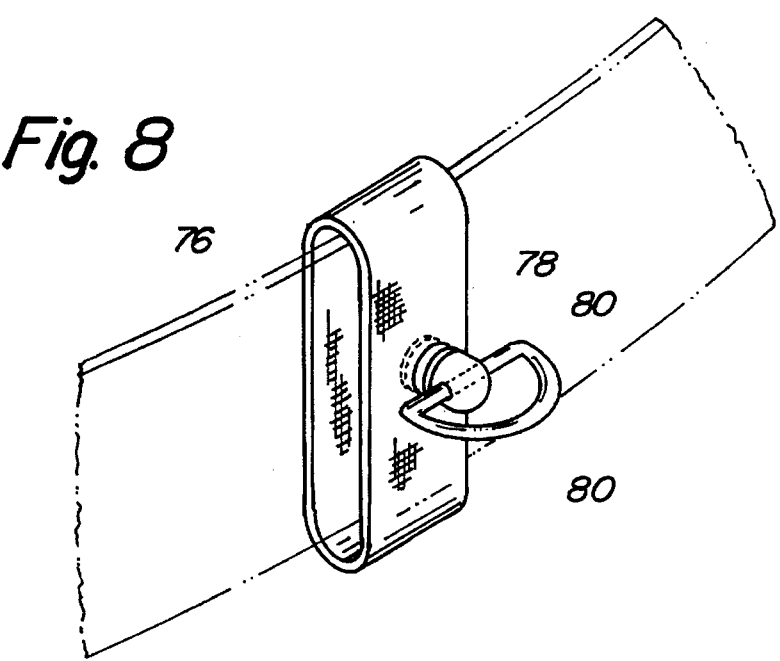
FIG. 8 is an enlarged perspective view of the slide loop illustrated in FIG. 5.

An alternate embodiment of the invention is shown in FIG. 8. In the alternate embodiment, a slide loop 76 is provided. Such slide loop is of an essentially inextensive material. It is positionable around the seat belt. It is movable along the length of the seat belt from one side edge of the car seat and supplemental seat to the other edge of the car seat and supplemental seat. Greater utility is provided to the slide loop through the use of a swivel component 78. The swivel component is secured to the slide loop on its exposed surface. It has a rigid ring 80 which is adapted to receive a clip from the leash of the animal to be secured thereby.

Dogs provide comfort, security, and love; but they require a great deal of care in return. Dog owners must walk the pets in every type of weather. It takes a special dedication and love, especially if the owner must take the dog in a new car. Dogs can quickly mess up a car's upholstery with shedding, drooling, scratching, or from just being wet or muddy. No matter how much an owner may love their dog, no one likes to see a new car get ruined. Yet, many owners frequently like to bring their pet along with them whenever possible. If the dog goes into a pond or a mud puddle, the car interior can quickly become very spoiled.

The present invention provides a way to protect the car's interior from the various types of damage caused by dogs. It is a platform that sits above the sat, thereby protecting the upholstery by providing a buffer area between the dog and the seat. The present invention consists of a pair of boxes upon which a piece of foam covered plywood is placed, designed to match the interior of the vehicle. The material is removable for easy cleaning and the whole unit can be folded and stored in the trunk when the back seat is needed for human passengers. The unit is 28 inches wide and 48 inches long, but could be produced in different sizes to accommodate a variety of vehicles.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved supplemental automobile seat for use by dogs traveling in an automobile comprising, in combination:

a horizontal seat component having parallel side edges, a rear edge positionable at a location adjacent to a rear edge of a rear car seat of the automobile, and a parallel forward edge positionable forwardly of a forward edge of the rear car seat, the horizontal seat component formed of a rigid component covered with a foam material, the horizontal seat component further having a width that is essentially equal to a width of the rear car seat upon which it is positioned;

a vertical seat component having parallel side edges, an upper edge positionable at a location adjacent to an upper edge of the rear car seat, and a parallel lower edge positionable at a location adjacent to the rear edge of the horizontal seat component, the vertical seat component formed of a foam material, the vertical seat component having a width that is essentially equal to the width of the rear car seat upon which it is positioned;

a cover secured over the horizontal seat component and the vertical seat component and with the cover having a living hinge integrally formed therealong at a region between the rear edge of the horizontal seat component and the lower edge of the vertical seat component to allow the seat components to be folded against each other to facilitate their storage, the cover further having a side edge with a slot formed therealong and with the seat components removable from the cover through the slot, the cover additionally including pile-type fasteners attached to areas of overlap adjacent to the slot and with the fasteners securable to prevent access to the seat components, the cover also including a pair of spaced slots formed through the living hinge and with each slot sized to receive a half of a seat belt of the rear car seat therethrough;

a pair of removable vertical legs positioned in contact with and extended downwardly from the horizontal seat component at a location adjacent to the forward edge thereof, the legs having lower ends positionable on a floor of the automobile at a location forwardly of the rear car seat; and a slide loop of an essentially inextensive material securable round the seat belt when the halves thereof are coupled together and with the slide loop having a size that allows it to move along a longitudinal extent of the coupled seat belt, the slide loop further having a swivel component secured thereto and with the swivel component securable with an end of a dog leash.

\* \* \* \* \*